United States Patent
Kim et al.

(10) Patent No.: US 8,597,551 B2
(45) Date of Patent: Dec. 3, 2013

(54) OPTICAL FILM

(75) Inventors: Kiyup Kim, Seoul (KR); Yonggyun Cho, Daejeon (KR); Sangyeup Lee, Daejeon (KR); Wonyeob Kim, Daejeon (KR); Wonseok Jang, Daejeon (KR); Myounglae Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/335,031

(22) Filed: Dec. 22, 2011

(65) Prior Publication Data

US 2012/0161086 A1      Jun. 28, 2012

(30) Foreign Application Priority Data

Dec. 23, 2010  (KR) .................. 10-2010-0133475
Dec. 21, 2011  (KR) .................. 10-2011-0138775

(51) Int. Cl.
| | | |
|---|---|---|
| F21V 9/14 | (2006.01) | |
| G02B 5/30 | (2006.01) | |
| G02C 7/12 | (2006.01) | |
| C09K 19/00 | (2006.01) | |
| C08B 3/06 | (2006.01) | |

(52) U.S. Cl.
USPC ............ 252/585; 428/1.1; 428/532; 527/300; 536/69

(58) Field of Classification Search
USPC ....... 252/585; 428/1.1, 532; 527/300; 536/69
See application file for complete search history.

(56) References Cited

U.S. PATENT DOCUMENTS

2007/0252293 A1*  11/2007  Sato et al. ................. 264/1.31
2008/0107829 A1*   5/2008  Oya et al. .................. 428/1.1

FOREIGN PATENT DOCUMENTS

| JP | 2003240955 A | 8/2003 |
|---|---|---|
| JP | 2004131637 A | 4/2004 |

* cited by examiner

*Primary Examiner* — Bijan Ahvazi
(74) *Attorney, Agent, or Firm* — The Webb Law Firm

(57) ABSTRACT

Provided is an optical film using a cellulose derivative, which is used in image display devices such as liquid-crystal display devices. A liquid-crystal display device with a polarizing plate using the optical film has an excellent viewing angle property. More particularly, the present invention relates to an optical film made of a cellulose ester resin, a portion of hydrogen atoms of hydroxyl groups of which is substituted with two or more substituent groups.

12 Claims, No Drawings

OPTICAL FILM

CROSS-REFERENCE TO RELATED APPLICATIONS

This application claims priority under 35 U.S.C. §119 to Korean Patent Application No. 10-2010-0133475 and 10-2011-0138775, filed on Dec. 23, 2010 and 21 Dec. 2011, in the Korean Intellectual Property Office, the disclosures of which are incorporated herein by reference in their entirety.

TECHNICAL FIELD

The present invention relates to an optical film made of a cellulose derivative, which is used in image display devices such as liquid-crystal display devices. More particularly, the present invention pertains to an optical compensation sheet, a retardation film and a polarizing plate, and a liquid-crystal display device having an excellent viewing angle property prepared by using the optical films.

BACKGROUND

A cellulose acetate film is mainly used to provide optical isotropy. However, an optical compensation sheet and a retardation film of a liquid-crystal display device need to have high optical anisotropy, and the film is subjected to stretching-treatment or a retardation controlling agent is added to provide high optical anisotropy.

However, a cellulose acetate material that is difficult to stretch does not provide a high retardation required for a retardation film by only stretching, and the retardation controlling agent needs to be added.

However, problems such as bleeding occur while providing the retardation, and there is a need to find a solution to the above problems.

SUMMARY

Therefore, the present invention provides an optical film having controlled retardation by a resin itself, without the addition of an additive.

The present invention relates to an optical film using a base resin, a cellulose ester resin with a portion of hydrogen atoms of hydroxyl groups of cellulose having a repeating unit shown in the following general formula 1 being substituted with two or more substituent groups.

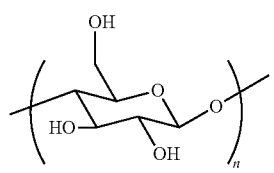

[general formula 1]

To be specific, the present invention relates to an optical film using a base resin, a cellulose ester resin with a portion of hydrogen atoms of hydroxyl groups of cellulose being substituted with an acyl group, particularly an acetyl group, and another portion of hydrogen atoms of the hydroxyl groups not being substituted with the acyl group but substituted with one or more substituent groups other than the acyl group, thus having two or more substituent groups.

To be more specific, the present invention relates to an optical film using a base resin, a cellulose ester resin with a portion of hydrogen atoms of hydroxyl groups of cellulose being substituted with an acyl group of the following formula 1 and one or more substituent groups selected from formula 2, wherein a degree of substitution with the acyl group is 2 to 2.9, and a total degree of substitution with the substituent groups other than the acyl group is 0.01 to 1.0.

—CO—R$_1$     [formula 1]

—X—R$_2$     [formula 2]

X is a chemical bond, or a connection group selected from —O—, —CO—, —CS—, —S—, —SO—, —SO$_2$—, —PR$_{11}$—, —POR$_{12}$—, and —NR$_{13}$— or a combination of two or more of the connection groups, and R$_{11}$, R$_{12}$ and R$_{13}$ are independently selected from H, (C1-C10)alkylene, (C6-C30)arylene, (C3-C20)cycloalkylene, and (C2-C10)alkenylene, with a proviso that X is not —CO—;

R$_1$ is selected from (C1-C10)alkyl and (C6-C30)aryl;

R$_2$ is selected from (C1-C10)alkyl, (C6-C30)aryl, (C3-C20)cycloalkyl, (C2-C10)alkenyl, and (C6~C30)ar(C1~C20)alkyl; and alkyl, aryl, cycloalkyl, alkenyl, and aralkyl of R$_1$ and R$_2$ may be further substituted with one or more substituent groups selected from 5-membered to 7-membered heterocycloalkyl including one or more elements selected from (C1-C10)alkyl, halogen, nitro, cyano, hydroxy, amino, (C6-C30)aryl, (C2-C10)alkenyl, (C3-C20)cycloalkyl, N, O, and S, and (C4-C30) heteroaryl including one or more elements selected from N, O, and S.

DETAILED DESCRIPTION OF EMBODIMENTS

Hereinafter, the present invention will be described in detail.

An optical film of the present invention uses a base resin, a cellulose ester resin with two or more substituents, among the substituents, an acyl group, and preferably an acetyl group is essentially included. In the present invention, an optical film can be made of only a cellulose ester resin having two or more substituents or made of a cellulose derivative mixture including the above cellulose ester resin.

That is, R of the following general formula 2 is substituted with an acyl group of the following formula 1 and one or more substituent groups selected from the following formula 2, and a degree of substitution with the acyl group is 2 to 2.9 and a total degree of substitution with one or more substituent groups other than the acyl group selected from the following formula 2 is 0.01 to 1.0.

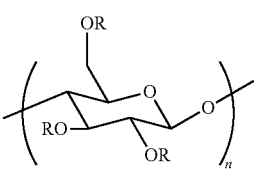

[general formula 2]

—CO—R$_1$     [formula 1]

—X—R$_2$     [formula 2]

X is a chemical bond, or a connection group selected from —O—, —CO—, —CS—, —S—, —SO—, —SO$_2$—, —PR$_{11}$—, —POR$_{12}$—, and —NR$_{13}$— or a combination of two or more of the connection groups, and R$_{11}$, R$_{12}$ and R$_{13}$ are independently selected from H, (C1-C10)alkylene, (C6-

C30)arylene, (C3-C20)cycloalkylene, and (C2-C10)alkenylene, with a proviso that X is not —CO—;

$R_1$ is selected from (C1-C10)alkyl and (C6-C30)aryl;

$R_2$ is selected from (C1-C10)alkyl, (C6-C30)aryl, (C3-C20)cycloalkyl, (C2-C10)alkenyl, and (C6-C30)ar(C1-C20)alkyl; and alkyl, aryl, cycloalkyl, alkenyl, and aralkyl of $R_1$ and $R_2$ may be further substituted with one or more substituent groups selected from 5-membered to 7-membered heterocycloalkyl including one or more elements selected from (C1-C10)alkyl, halogen, nitro, cyano, hydroxy, amino, (C6-C30)aryl, (C2-C10)alkenyl, (C3-C20)cycloalkyl, N, O, and S, and (C4-C30) heteroaryl including one or more elements selected from N, O, and S.

Including 'alkyl' of the present invention and other alkyl portions, a substituent has a straight- or branched-chained type.

'Aryl' of the present invention is an organic radical derived from aromatic hydrocarbons, from which one hydrogen atom is removed, and includes a single or fused ring system including 4 to 7 ring atoms and preferably 5 or 6 ring atoms for each ring. Illustrating and non-limiting specific examples include phenyl, naphthyl, biphenyl, and tolyl.

To be more specific, formula 1 is selected from —CO—CH₃, —CO—CH₂CH₃, —CO—CH₂CH₂CH₃, and —CO—CH₂CH₂CH₂CH₃.

Further, to be more specific, X of formula 2 is a chemical bond, or selected from —O—, —CS—, —S—, —SO—, and —SO₂—, $R_2$ is selected from (C1-C10)alkyl and (C6-C30)aryl, and alkyl and aryl of $R_2$ may be further substituted with one or more substituent groups selected from 5-membered to 7-membered heterocycloalkyl including one or more elements selected from (C1-C10)alkyl, halogen, nitro, cyano, hydroxy, amino, (C6-C30)aryl, (C2-C10)alkenyl, (C3-C20)cycloalkyl, N, O, and S, and (C4-C30) heteroaryl including one or more elements selected from N, O, and S.

More preferably, formula 1 is —CO—CH₃, X of formula 2 is a chemical bond or —SO₂—, $R_2$ is selected from (C1-C10)alkyl and (C6-C30)aryl, and alkyl and aryl of $R_2$ may be further substituted with (C1-C10)alkyl.

In the present invention, the total degree of substitution of the cellulose ester resin is preferably 2.5 to 3.0, the degree of substitution with the acyl group is preferably 2 to 2.9, and when cellulose acetate includes the acyl group consisting of only the acetyl group, the degree of acetyl substitution is more preferably 2.4 to 2.9. The acyl group is not particularly limited, but it is preferable to use an acyl group having 2 to 4 carbon atoms. It is preferable to use an acetyl group or a propyonyl group, and an acetyl group is particularly preferable. The degree of substitution used in the present specification is measured based on D-817-91 of ASTM.

Further, it is preferable that the total degree of substitution with one or more substituent groups other than the acyl group selected from formula 2 is 0.01 to 1.0. When the degree of substitution is low or high, it is difficult to control the optical anisotropy.

In the present invention, the resin is controlled to have two or more substituent groups, in detail, two or more substituent groups including the acyl group and substituent groups other than the acyl group, accordingly, retardation of the resin is capable of being controlled without a retardation additive.

In the present invention, the range of molecular weight of cellulose ester resin is not limited, and a weight average molecular weight of which is 150,000 or more and more preferably 150,000 to 400,000. When the weight average molecular weight is low, mechanical strength of the film is reduced, and when the weight average molecular weight is very high, solubility is reduced. Further, a molecular weight distribution Mw/Mn (Mw is the weight average molecular weight and Mn is the number average molecular weight) of cellulose ester resin is preferably 1.2 to 2.0 and more preferably 1.4 to 1.8. The weight average molecular weight is measured by a GPC using methylene chloride as a solvent.

It is preferable that the optical film using a cellulose ester resin of the present invention is produced according to a solvent casting method using a dope solution. The solvent casting method includes casting a solution (dope) including the cellulose ester resin dissolved in a solvent on a support and vaporizing the solvent to form the film.

Drying is performed so that the water content of cellulose ester resin is 2 wt % or less and more preferably 1 wt % or less to produce the dope solution.

A description is given of an additive used in the optical film of the present invention below.

Various additives used in various production processes, for example, additives such as plasticizers, UV inhibitors, degradation inhibitors, fine particles, release agents, and IR absorbents may be added to the cellulose ester solution (dope) used in the solvent casting method. Specific types of the additives are not limited as long as the additives are typically used in the art, and it is preferable that the content of the additive is within a range where physical properties of the film are not reduced. The time of adding the additive depends on the type of additive. The additive may be added during the final step of a dope production process.

The plasticizer is used to control mechanical properties of the film, and the drying time of the film is reduced using the plasticizer. The species of the plasticizer is not limited as long as the plasticizer is typically used, and examples include phosphate ester and carboxylate ester selected from phthalate ester and citrate ester. Examples of phosphate ester include triphenyl phosphate (TPP), biphenyldiphenyl phosphate, and tricresyl phosphate (TCP). Examples of phthalate ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of citrate ester include o-acetyltriethyl citrate (OACTE) and o-acetyltributyl citrate (OACTB). Examples of carboxylate ester include butyl oleate, methylacetyllysine oleate, dibutyl sebacate, and various types of trimellitate ester. Preferably, a phthalate ester (DMP, DEP, DBP, DOP, DPP, and DEHP) plasticizer is used. The content of the plasticizer is 2 to 20 parts by weight and more preferably 5 to 15 parts by weight based on 100 parts by weight of cellulose ester resin.

Examples of the UV inhibitor include a hydroxybenzophenone-based compound, a benzotriazole-based compound, a salicylate ester-based compound, and a cyanoacrylate-based compound. The content of the UV inhibitor is 0.1 to 3 parts by weight and more preferably 0.5 to 2 parts by weight based on 100 parts by weight of cellulose acetate.

Examples of the degradation inhibitor include an antioxidant, a peroxide decomposer, a radical inhibitor, a metal inactivator, a deoxidizer, and a photostabilizer (hindered amine). Particularly preferable examples of the degradation inhibitor include butylated hydroxytoluene (BHT) and tribenzylamine (TBA). The content of the degradation inhibitor is 0.01 to 5 parts by weight and more preferably 0.1 to 1 part by weight based on 100 parts by weight of cellulose ester resin.

The fine particles are added to suppress curling of the film and ensure a favorable transporting property of the film and favorable attachment inhibition or scratch resistance in a roll form, and any one compound selected from inorganic compounds and organic compounds may be used. Preferable examples of the inorganic compounds include a compound including silicon, silicon dioxide, titanium oxide, zinc oxide, aluminum oxide, barium oxide, zirconium oxide, strontium oxide, antimony oxide, tin oxide, tin oxide and antimony, calcium carbonate, talc, clay, calcined kaolin, calcined calcium silicate, calcium silicate hydrate, aluminum silicate, magnesium silicate and calcium phosphate, and more preferable examples thereof include an inorganic compound including silicon or zirconium oxide. An average primary particle size of the fine particles is 80 nm or less, preferably 5 to 80 nm, more preferably 5 to 60 nm, and particularly preferably 8 to 50 nm. When the average primary particle size is more than 80 nm, surface smoothness of the film is reduced.

In the present invention, the concentration of solids in the dope is 15 to 25 wt % and more preferably 16 to 23 wt %. When the concentration of solids in the dope is less than 15 wt %, fluidity is too high to hinder formation of the film, and when the concentration is more than 25 wt %, it is difficult to obtain perfect dissolution.

In the present invention, the content of the cellulose ester resin is 70 wt % or more, preferably 70 to 90 wt %, and more preferably 80 to 85 wt % based on the total content of solids.

Further, the present invention may further include 5 to 50 parts by weight of a cellulose triacetate resin based on 100 parts by weight of the cellulose ester resin.

When the film is produced using the solvent casting method, a solvent used to produce the cellulose ester resin composition (dope) is preferably an organic solvent. It is preferable that a halogenated hydrocarbon is used as the organic solvent, examples of halogenated hydrocarbon include chlorinated hydrocarbon, methylene chloride, and chloroform, and it is most preferable to use methylene chloride.

Further, organic solvents other than halogenated hydrocarbon are used in a mixture form if necessary. Examples of the organic solvent other than halogenated hydrocarbon include esters, ketones, ethers, alcohols, and hydrocarbons. Examples of esters include methyl formate, ethyl formate, propyl formate, pentyl formate, methyl acetate, ethyl acetate, and pentyl acetate, examples of ketones include acetone, methyl ethyl ketone, diethyl ketone, diisobutyl ketone, cyclopentanone, cyclohexanone, and methylcyclohexanone, examples of ethers include diisopropyl ether, dimethoxymethane, dimethoxyethane, 1,4-dioxane, 1,3-dioxolane, tetrahydrofuran, anisole, and phenetol, and examples of alcohols include methanol, ethanol, 1-propanol, 2-propanol, 1-butanol, 2-butanol, t-butanol, 1-pentanol, 2-methyl-2-butanol, cyclohexanol, 2-fluoroethanol, 2,2,2-trifluoroethanol, and 2,2,3,3-tetrafluoro-1-propanol.

More preferably, methylene chloride is used as a primary solvent and alcohols are used as a secondary solvent. To be specific, methylene chloride and alcohols are mixed at a weight ratio of 80:20 to 95:5.

The optical film of the present invention is produced using a typical solvent casting method. To be more specific, the produced dope is stored in a storage tank and foams are removed from the dope. The defoamed dope is transported from a dope outlet to a pressure type die using a pressure type metering gear pump used to transport liquid in a highly precise amount according to the number of revolutions, and uniformly cast on a metal support endlessly traveling from an anvil (slit) of the pressure type die to peel an insufficiently dried dope film (also called web) from the metal support at a peeling point at which the metal support stops traveling. While both ends of the produced web are fixed by clips to maintain a width thereof, the web is transported to a tenter to be dried, moved to a roller of a drying device to be dried again, and wound to a predetermined length by a winder.

When the solution is applied, a space temperature is preferably −50 to 50° C., more preferably −30 to 40° C., and most preferably −20 to 30° C. The cellulose ester solution applied at a low space temperature is rapidly cooled on the support to increase strength of a gel, accordingly, a film including the residual organic solvent in a large amount is formed. Therefore, the film is peeled from the support for a short period of time while the organic solvent is not vaporized from the film. Examples of gas used to cool the space include air, nitrogen, argon, or helium. Relative humidity is preferably 0 to 70% and more preferably 0 to 50%.

The temperature of the support (casting portion) on which the cellulose ester solution is applied is preferably −50 to 130° C., more preferably −30 to 25° C., and most preferably −20 to 15° C. Cold gas may be provided to the casting portion to cool the casting portion. A cooling device may be provided to the casting portion to cool the space. It is important to prevent the casting portion from coming into contact with water during cooling. When gas is used during the cooling, it is preferable to use dry gas in advance.

Further, the film may be subjected to surface treatment if necessary. The surface treatment is typically performed to improve an attachment property of the film. Examples of the surface treatment include glow discharge treatment, UV radiation treatment, corona treatment, flame treatment, and saponification treatment.

Further, the film is stretched to control the degree of delay. The degree of stretch is preferably −10 to 100%, more preferably −10 to 50%, and most preferably −5 to 30%.

The thickness of the film is preferably 20 to 140 μm and more preferably 40 to 80 μm.

Tear strength of the film is measured using an Elmendorf tear strength machine according to JIS K 7128. When tear strength is very low, the film is easily torn. Therefore, tear strength is preferably 0.1 N or more and more preferably 0.15 N or more.

The optical film according to the present invention is used in a polarizing plate, an optical compensation sheet, a retardation film and a liquid-crystal display device, and applied in a laminate form of one or more optical films.

The polarizing plate according to the present invention includes the optical film of the present invention as a protective film of a polarizer. That is, the optical film of the present invention is used as the protective film of the polarizing plate. The polarizing plate typically includes a polarizer and two transparent protective films provided at both sides of the polarizer. The optical film of the present invention is used as at least one of the protective films. A cellulose acylate film may be typically used as another protective film. Examples of the polarizer include an iodine-containing polarizer, a dye-containing polarizer including a dichroic dye, and a polyene-based polarizer. The iodine-containing polarizer and the dye-containing polarizer are typically produced using a polyvinyl alcohol-based film. When the optical film of the present invention is used as the protective film for the polarizing plate, a process for producing the polarizing plate is not particularly limited, and the polarizing plate is produced using a typically adopted process. The process includes treating the resulting cellulose acylate film or a typically used cellulose acylate film using alkali, and bonding the cellulose acylate film to one or both sides of the polarizer produced using a procedure including immersing a polyvinyl alcohol film in an iodine solution using a solution of polyvinyl alcohol in water, which is sufficiently saponificated, and stretching the polyvinyl alcohol film.

When the optical film of the present invention is bonded to the polarizer, the optical film is longitudinally bonded with respect to an absorption axis of the polarizer to implement continuous production.

Further, the optical film according to the present invention is used as a support for optical compensation sheets. In other words, an optical compensation layer is formed on the optical film of the present invention to produce the optical compensation sheet. It is preferable that an orientation layer is provided to the optical compensation layer if necessary.

Means such as rubbing treatment of the organic compound (preferably a polymer), oblique angle vapor deposition of the inorganic compound, and formation of a layer having microgrooves are provided to the orientation layer. Further, it is well known an electric field or a magnetic field is provided, or light is radiated to allow the orientation layer to have an orientation function. However, it is particularly preferable that the orientation layer is formed using the rubbing treatment of the polymer. It is preferable that the rubbing treatment includes unidirectionally rubbing the surface of the polymer layer using papers or fibers several times. It is preferable that the absorption axis of the polarizer and the rubbing direction is substantially parallel to each other. Preferable examples of the polymer used in the orientation layer include polyimide and polyvinyl alcohol. The thickness of the orientation layer is preferably 0.01 to 5 μm and more preferably 0.05 to 2 μm.

It is preferable that the optically anisotropic layer includes a liquid crystal compound. It is particularly preferable that the liquid crystal compound used in the present invention is a discotic liquid crystal compound or a rod type liquid crystal compound.

A liquid-crystal display device according to the present invention includes the polarizing plate of the present invention.

For example, the polarizing plate of the present invention is bonded to a liquid crystal cell of the liquid-crystal display device using an adhesive. It is preferable that the optical film of the present invention is provided as a protective film to the liquid-crystal cell of the polarizing plate.

The optical film may be bonded to both sides or one side of the liquid-crystal cell. Further, a combination of optical films having different optical properties may be used.

A better understanding of the present invention may be obtained in light of the following examples which are set forth to illustrate, but are not to be construed to limit the present invention.

The following physical properties of the film were measured using the following measurement methods.

1) Optical Anisotropy

Light having a wavelength of 590 nm was incident on the film in a normal direction to measure Re using a birefringence measuring device (trademark: Axoscan, manufactured by Axometrics, Inc.). Light having the wavelength of 590 nm was incident on the film at angles of 0° to 50° at intervals of 10° with respect to the normal direction using the in-plane slow axis of Re as the tilt axis to measure three refractive index components of an indicatrix, and Rth was calculated by the following equation using the three components.

$$Rth=[(n_x+n_y)/2-n_z]\times d$$

$n_x$: Refractive index in a direction of a larger refractive index of two refractive indexes of a plane $n_y$: Refractive index in a direction of a smaller refractive index of two refractive indexes of a plane $n_z$: Refractive index in a thickness direction 2) Degree of Substitution The degree of substitution was measured based on D-817-91 of ASTM.

EXAMPLES 1 TO 6 AND COMPARATIVE EXAMPLES 1 TO 3

Production of the Dope

The compositions of the following Table 1 were added to the agitator and dissolved at 30° C. The obtained dope was heated to 30° C., transported to the gear pump, filtered using the filter paper having the absolute filtration precision of 0.01 mm, and additionally filter using the cartridge filtering device having the absolute filtration precision of 5 μm.

The substituents of the cellulose ester resins of the examples and the comparative examples of the following Table 1 were different from each other, and the type of substituents and the degree of substitution are described in Table 2. The cellulose ester resin having the weight average molecular weight of 270000 was used in comparative example 1, comparative example 2, and examples 1 to 4, and the cellulose ester resin having the weight average molecular weight of 230000 was used in comparative example 3 and examples 5 and 6.

TABLE 1

| | Composition (parts by weight) |
|---|---|
| Cellulose ester resin | 100 |
| Methylene chloride | 445 |
| Methanol | 39 |
| Triphenyl phosphate | 6.7 |
| Biphenyl diphenyl phosphate | 3.3 |
| UV inhibitor 1 (Tinuvin 328, Ciba, Co., Ltd.) | 1 |
| UV inhibitor 2 (Tinuvin 327, Ciba, Co., Ltd.) | 0.5 |
| $SiO_2$ | 0.3 |

TABLE 2

| Cellulose ester resin | Substituent group 1 (—CO—$R_1$) | Degree of substitution with substituent group 1 | Substituent group 2 (—X—$R_2$) | Degree of substitution with substituent group 2 | Total degree of substitution |
|---|---|---|---|---|---|
| Example 1 | —CO—$CH_3$ | 2.72 | —$CH_3$ | 0.21 | 2.93 |
| Example 2 | —CO—$CH_3$ | 2.72 | —$CH_2CH_3$ | 0.17 | 2.89 |
| Example 3 | —CO—$CH_3$ | 2.83 | —$CH_3$ | 0.12 | 2.95 |
| Example 4 | —CO—$CH_3$ | 2.83 | —$CH_2CH_3$ | 0.11 | 2.94 |

TABLE 2-continued

| Cellulose ester resin | Substituent group 1 (—CO—R$_1$) | Degree of substitution with substituent group 1 | Substituent group 2 (—X—R$_2$) | Degree of substitution with substituent group 2 | Total degree of substitution |
|---|---|---|---|---|---|
| Example 5 | —CO—CH$_3$ | 2.46 | —SO$_2$—⟨C$_6$H$_4$⟩—CH$_3$ | 0.08 | 2.54 |
| Example 6 | —CO—CH$_3$ | 2.46 | —SO$_2$—(naphthyl) | 0.15 | 2.61 |
| Comparative example 1 | —CO—CH$_3$ | 2.72 | — | — | 2.72 |
| Comparative example 2 | —CO—CH$_3$ | 2.83 | — | — | 2.83 |
| Comparative example 3 | —CO—CH$_3$ | 2.46 | — | — | 2.46 |

In Table 2, substituent groups 1 and 2 mean substituents substituted in R of the following general formula 2.

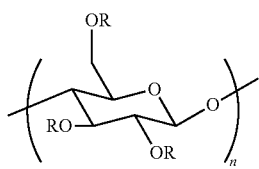

[general formula 2]

Production of the Cellulose Ester Film

The dope obtained during the filtration process was cast on the support made of mirror stainless steel using the casting die and peeled. The amount of residual solvent was controlled to be 20 wt % during the peeling. After connection to the tenter, the film was transversely stretched by 2% (% means the percentage of the length based on 100% of the total length), and left and right ends of the film were removed by 150 mm after the film passed from the tenter. The film from which the ends were removed was dried using the drying device, both ends of the film passing through the drying device were cut by 3 cm, knurls having the height of 100 μm were formed on portions that were 10 mm apart from both edges of the film, and the film was wound in a roll form. The optical anisotropy of the obtained sample was measured using the above-mentioned method, and the result is described in the following Table 3.

TABLE 3

|  | Thickness (μm) | Re (nm) | Rth (nm) |
|---|---|---|---|
| Example 1 | 60 | 7.1 | 64.6 |
| Example 2 | 60 | 9.2 | 73.7 |
| Example 3 | 59 | 4.7 | 56.5 |
| Example 4 | 59 | 6.3 | 61.8 |
| Example 5 | 59 | 6.8 | 202.5 |
| Example 6 | 59 | 16.5 | 286.4 |
| Comparative example 1 | 59 | 4.6 | 48.9 |
| Comparative example 2 | 58 | 3.3 | 36.9 |
| Comparative example 3 | 60 | 2.2 | 117.4 |

From the tables, it can be seen that the substituent groups other than acetate are used to increase retardation and the degree of substitution is controlled to adjust retardation.

In the optical film according to the present invention, the type of substituent group and the degree of substitution are controlled to adjust optical anisotropy of the cellulose ester resin, thus controlling retardation of the optical film without the retardation controlling agent.

What is claimed is:

1. An optical film using a base resin, a cellulose ester resin with a portion of hydrogen atoms of hydroxyl groups of cellulose being substituted with an acyl group of the following formula 1 and one or more substituent groups selected from formula 2, wherein a degree of substitution with the acyl group is 2.46 to 2.72, and a total degree of substitution with the substituent groups other than the acyl group is 0.11 to 0.54, —CO—R$_1$  [formula 1]

—X—R$_2$  [formula 2]

wherein, X is a connection group selected from the group consisting of —CS—, —S—, —SO—, —SO$_2$—, —PR$_{11}$—, —POR$_{12}$—, —NR$_{13}$— and a combination of two or more of the connection groups, and R$_{11}$, R$_{12}$ and R$_{13}$ are independently selected from the group consisting of H, (C$_1$-C$_{10}$)alkylene, (C$_6$-C$_{30}$)arylene, (C$_3$-C$_{20}$)cycloalkylene, and (C$_2$-C$_{10}$)alkenylene;

R$_1$ is (C$_1$-C$_{10}$)alkyl;

R$_2$ is selected from the group consisting of (C$_1$-C$_{10}$)alkyl, (C$_6$-C$_{30}$)aryl, (C$_3$-C$_{20}$)cycloalkyl, (C$_2$-C$_{10}$)alkenyl, and (C$_6$-C$_{30}$)ar(C$_1$-C$_{20}$)alkyl; and alkyl, aryl, cycloalkyl, alkenyl, and aralkyl of R$_1$ and R$_2$ may be further substituted with one or more substituent groups selected from the group consisting of 5-membered to 7-membered heterocycloalkyl including one or more elements selected from the group consisting of $(C_1$-$C_{10})$alkyl, halogen, nitro, cyano, hydroxy, amino, $(C_6$-$C_{30})$aryl, $(C_2$-$C_{10})$alkenyl, $(C_3$-$C_{20})$cycloalkyl, N, O, and S, and $(C_4$-$C_{30})$ heteroaryl including one or more elements selected from the group consisting of N, O, and S.

2. The optical film of claim 1, wherein formula 1 is selected from the group consisting of —CO—CH$_3$, —CO—CH$_2$CH$_3$, —CO—CH$_2$CH$_2$CH$_3$, and —CO—CH$_2$CH$_2$CH$_2$CH$_3$, X of formula 2 is selected from the group consisting of —CS—, —S—, —SO—, and —SO$_2$—, R$_2$ is selected from the group consisting of $(C_1$-$C_{10})$alkyl and $(C_6$-$C_{30})$aryl, and alkyl and aryl of R$_2$ may be further substituted with one or more substituent groups selected from the group consisting of 5-membered to 7-membered heterocycloalkyl including one or more elements selected from the group consisting of $(C_1$-$C_{10})$alkyl, halogen, nitro, cyano, hydroxy, amino, $(C_6$-$C_{30})$aryl, $(C_2$-$C_{10})$alkenyl, $(C_3$-$C_{20})$cycloalkyl, N, O, and S, and $(C_4$-$C_{30})$ heteroaryl including one or more elements selected from the group consisting of N, O, and S.

3. The optical film of claim 2, wherein formula 1 is —CO—CH$_3$, X of formula 2 is —SO$_2$—, R$_2$ is selected from the group consisting of $(C_1$-$C_{10})$alkyl and $(C_6$-$C_{30})$aryl, and alkyl and aryl of R$_2$ may be further substituted with $(C_1$-$C_{10})$ alkyl.

4. The optical film of claim 1, wherein the cellulose ester resin has a weight average molecular weight of 150,000 to 400,000.

5. The optical film of claim 1, further comprising 5 to 50 parts by weight of a cellulose triacetate resin based on 100 parts by weight of the cellulose ester resin.

6. An optical compensation sheet comprising the optical film of claim 1.

7. A retardation film comprising the optical film of claim 1.

8. A polarizing plate comprising the optical film of claim 1.

9. A liquid-crystal display device comprising the optical film of claim 1.

10. The optical film of claim 1, wherein a degree of substitution with the acyl group is 2.46 to 2.72, and a total degree of substitution with the substituent groups other than the acyl group is 0.11 to 0.21.

11. An optical film using a base resin, a cellulose ester resin with a portion of hydrogen atoms of hydroxyl groups of cellulose being substituted with an acyl group of the following formula 1 and one or more substituent groups selected from formula 2, wherein a degree of substitution with the acyl group is 2.72 to 2.9, and a total degree of substitution with the substituent groups other than the acyl group is 0.01 to 1.0, —CO—R$_1$  [formula 1]

—X—R$_2$  [formula 2]

wherein, X is a single chemical bond;
R$_1$ is selected from the group consisting of $(C_1$-$C_{10})$alkyl and $(C_6$-$C_{30})$aryl;
R$_2$ is selected from the group consisting of $(C_1$-$C_{10})$alkyl, $(C_6$-$C_{30})$ aryl, $(C_3$-$C_{20})$cycloalkyl, $(C_2$-$C_{10})$alkenyl, and $(C_6$-$C_{30})$ar$(C_1$-$C_{20})$alkyl; and
alkyl, aryl, cycloalkyl, alkenyl, and aralkyl of R$_1$ and R$_2$ may be further substituted with one or more substituent groups selected from the group consisting of 5-membered to 7-membered heterocycloalkyl including one or more elements selected from the group consisting of $(C_1$-$C_{10})$alkyl, halogen, nitro, cyano, hydroxy, amino, $(C_6$-$C_{30})$aryl, $(C_2$-$C_{10})$alkenyl, $(C_3$-$C_{20})$cycloalkyl, N, O, and S, and $(C_4$-$C_{30})$ heteroaryl including one or more elements selected from the group consisting of N, O, and S.

12. An optical film using a base resin, a cellulose ester resin with a portion of hydrogen atoms of hydroxyl groups of cellulose being substituted with an acyl group of the following formula 1 and one or more substituent groups selected from formula 2, wherein a degree of substitution with the acyl group is 2 to 2.9, and a total degree of substitution with the substituent groups other than the acyl group is 0.01 to 1.0, —CO—R$_1$  [formula 1]

—X—R$_2$  [formula 2]

wherein, X is a connection group selected from the group consisting of —COS—, —COSO$_2$—, —COPR$_{11}$—, —COPOR$_{12}$— and —CONR$_{13}$—,
R$_{11}$, R$_{12}$ are independently selected from the group consisting of H, $(C_1$-$C_{10})$alkylene, $(C_6$-$C_{30})$arylene, $(C_3$-$C_{20})$cycloalkylene, and $(C_2$-$C_{10})$alkenylene,
R$_{13}$ is selected from the group consisting of $(C_1$-$C_{10})$alkylene, $(C_6$-$C_{30})$arylene, $(C_3$-$C_{20})$cycloalkylene, and $(C_2$-$C_{10})$alkenylene;
R$_1$ is selected from the group consisting of $(C_1$-$C_{10})$alkyl and $(C_6$-$C_{30})$aryl;
R$_2$ is selected from the group consisting of $(C_1$-$C_{10})$alkyl, $(C_6$-$C_{30})$aryl, $(C_3$-$C_{20})$cycloalkyl, $(C_2$-$C_{10})$alkenyl, and $(C_6$-$C_{30})$ar$(C_1$-$C_{20})$alkyl; and
alkyl, aryl, cycloalkyl, alkenyl, and aralkyl of R$_1$ and R$_2$ may be further substituted with one or more substituent groups selected from the group consisting of 5-membered to 7-membered heterocycloalkyl including one or more elements selected from the group consisting of $(C_1$-$C_{10})$alkyl, halogen, nitro, cyano, hydroxy, amino, $(C_6$-$C_{30})$aryl, $(C_2$-$C_{10})$alkenyl, $(C_3$-$C_{20})$cycloalkyl, N, O, and S, and $(C_4$-$C_{30})$ heteroaryl including one or more elements selected from the group consisting of N, O, and S.

* * * * *

UNITED STATES PATENT AND TRADEMARK OFFICE
CERTIFICATE OF CORRECTION

PATENT NO.         : 8,597,551 B2                                           Page 1 of 1
APPLICATION NO.    : 13/335031
DATED              : December 3, 2013
INVENTOR(S)        : Kiyup Kim et al.

It is certified that error appears in the above-identified patent and that said Letters Patent is hereby corrected as shown below:

In the Claims

Column 10, Line 63, Claim 1, delete "$(C_{6-30})aryl$," and insert -- $(C_6\text{-}C_{30})aryl$, --

Signed and Sealed this
Eighteenth Day of March, 2014

Michelle K. Lee
*Deputy Director of the United States Patent and Trademark Office*